Figure 4:
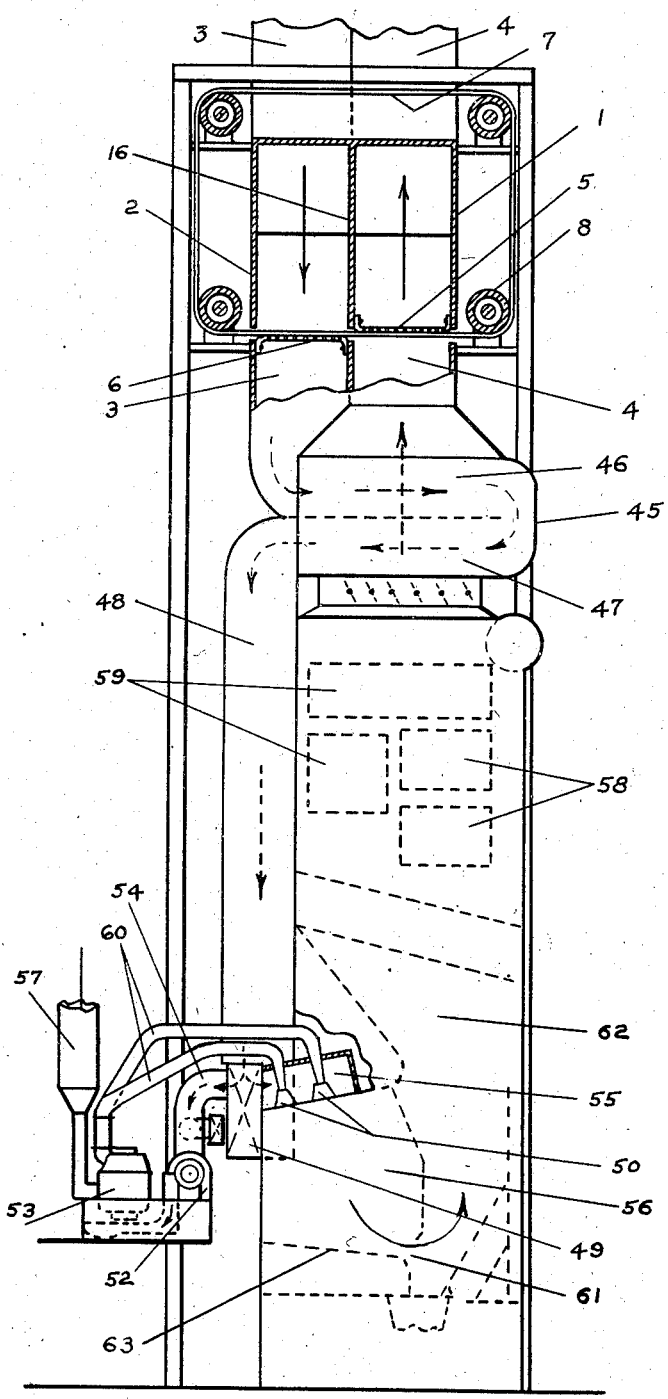

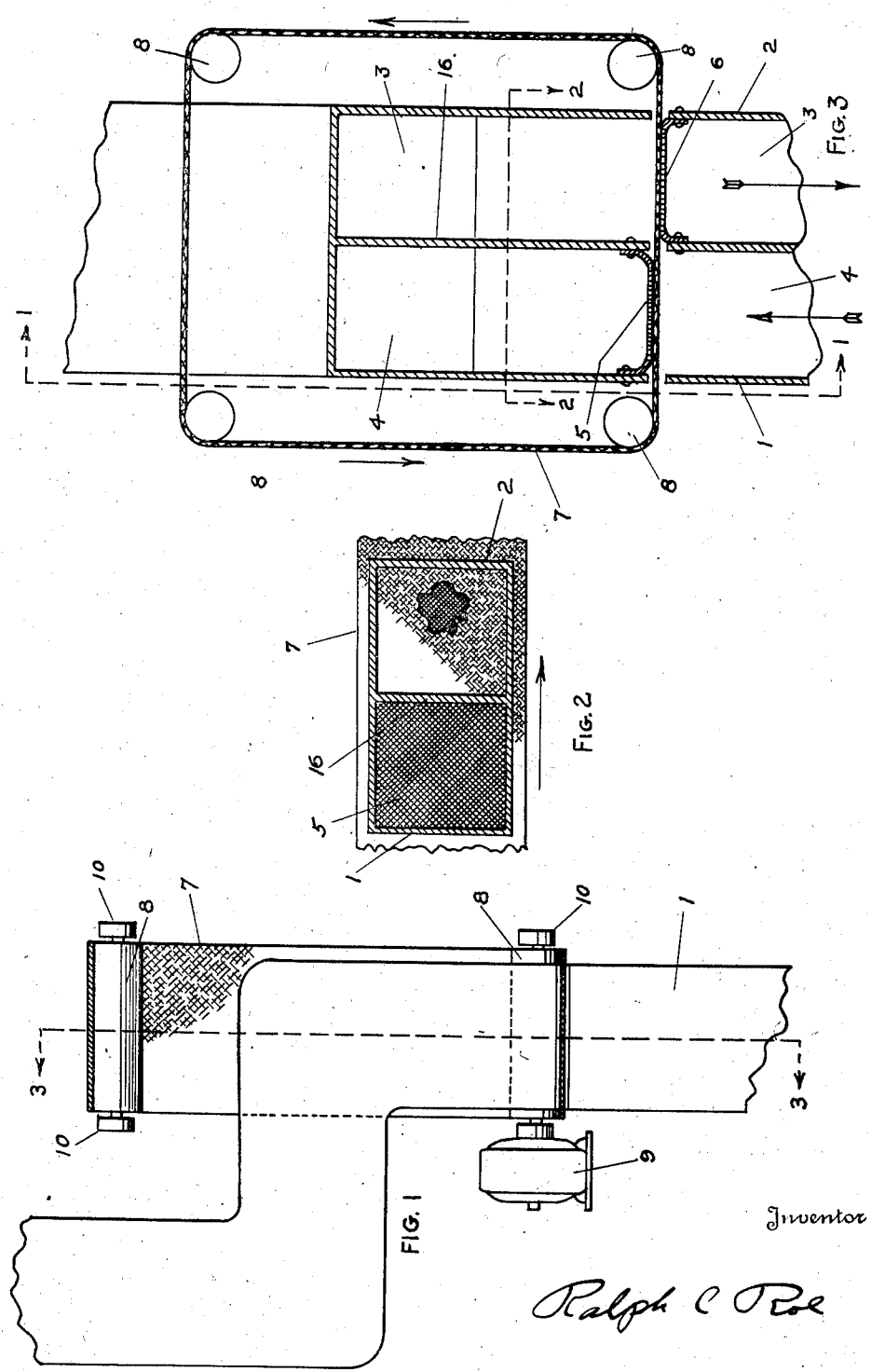

Oct. 8, 1940.   R. C. ROE   2,216,986
FLUE GAS FILTER
Filed March 9, 1938   2 Sheets-Sheet 2

Inventor
Ralph C Roe

Patented Oct. 8, 1940

2,216,986

UNITED STATES PATENT OFFICE 2,216,986

FLUE GAS FILTER

Ralph C. Roe, Englewood, N. J., assignor of one-half to Stephen W. Borden, Summit, N. J.

Application March 9, 1938, Serial No. 194,745

2 Claims. (Cl. 110—165)

This invention pertains to equipment for filtering flue gases from steam boilers and to preheating air for the same.

One of the objects of the invention is to remove the fly ash from the flue gas and to effectively dispose of the same. Another object is to provide relatively inexpensive equipment for the purpose and equipment which requires a comparatively small amount of power for its operation. Another object is to provide a unitary means for filtering the flue gas and for transferring heat from the flue gases to the air used for combustion.

The drawings, which are schematic, represent a gas flue and an air-intake flue having a common partition and these, together with a filter belt, are shown, partly in section, in Figs. 1, 2, and 3. Fig. 1 is a section on line 3—3 of Fig. 3. Figs. 2 and 3 are each sections or views partly in section. Fig. 4 is a schematic representation of a slag-tap furnace installed in a water tube boiler and having a filter of the type shown in Fig. 1 mounted on top of the boiler.

The equipment may consist of an endless belt which passes first through a channel in which the flue gas is flowing and in such manner that the flue gas is forced to pass through the belt and immediately thereafter the belt passes through a second channel where the belt is cleaned, this being accomplished, in the case of slag tap furnaces, by means of the stream of incoming air which is used for combustion. The belt is constructed of woven fabric, either with or without mechanical reinforcing, consisting principally of spun glass, rock wool, asbestos fiber or similar material which is capable of withstanding high temperatures and at the same time capable of being woven into a mesh close enough to act as a filtering medium and yet porous enough to allow passage of gas and air through the same. I prefer woven glass fabric.

Referring to the drawings, Figs. 1, 2, and 3, 4 is a flue gas channel, having an exterior wall 1, in which the flue gases from a boiler flow upward in the direction indicated by the arrow, and 3 is an intake air channel for the boiler, having an exterior wall 2, and in which air is flowing to the boiler in the direction indicated by the arrow. 16 is a common wall between the two channels. 7 is the filter belt which is supported by rollers 8 revolving in bearings 10 and driven by a slow speed motor 9. 5 is a pressure plate installed above the belt, and 6 is a pressure plate installed below the belt. Fig. 2 is a view looking directly down into the channels, 5 being the pressure plate in the flue gas channel while the pressure plate 6 in the air channel is beneath the belt 7.

I prefer to make the belt 7 of woven glass fabric but it may be of any woven fabric which is capable of withstanding the temperatures involved and having a sufficiently close mesh to act as a filtering medium and yet porous enough to allow passage of gas and air through the same. As the belt moves, slowly, through the flue gas duct 4, it accumulates, largely on the surface, a large amount of dust and ash contained in the flue gases which are passing through this duct and hence through the belt. The pressure of the flue gas against the belt is taken up by the stationary grid plate 5 upon which the belt slides. Passing through the common wall 16, the belt enters chamber 3 where it enters the stream of incoming air flowing to the furnace, which air blows off the dust accumulated in passage 4, and carries it back to the furnace where it originated. If the furnace is of the slag tap variety, a great deal of this dust is melted and never reappears in the gases again although a small portion of it will reappear and have to be again returned to the furnace.

It will be noted that belt 7 passes immediately from channel 4 into channel 3 and therefore whatever heat is taken up by belt 7 from the flue gases is transferred to the combustion air entering the furnace, and if belt 7 is reinforced with metal members, either woven into the fabric or in the form of supporting frames, the amount of heat thus transferred will be substantial and this is a useful function of the device.

Referring now to Fig. 4. Fuel for the slag-tap furnace enters through ducts 60 and burners 50 into the hot zone of the furnace which is indicated generally by the space 55. Primary air for combustion is drawn from windbox 49 and enters the combustion chamber with the fuel and secondary air may enter directly from box 49 into the combustion chamber. From the combustion chamber the gases of combustion and some non-combustible materials leave the chamber through passage 61 as indicated by the arrow and flow upward through boiler 62 through the various tube banks, superheater 58, economizer 59 and through the heat exchanger 45 and into the flue-gas duct 4 and thence through filter belt 7 to the atmosphere. Air for combustion is drawn in through duct 3 and on its way to the furnace passes through the belt 7 and heat exchanger 45 to windbox 49 from whence part is introduced into the furnace along with the fuel and part may go in directly.

In the slag-tap type of furnace the maximum temperature in combustion chamber 56 runs between 3000° and 3200° Fahrenheit and this high temperature is sufficient to melt practically all noncombustible matter introduced into the furnace and it falls downward onto grate 62 where it forms a molten mass which is tapped or drawn off as desired. In this type of furnace, as differentiated from other types, the only reason why any non-combustible matter passes out through opening 61 and is carried up through the furnace is that it does not have a chance to remain in chamber 56 long enough to be melted or to be caught in the rain of molten particles which are constantly dropping downward in chamber 56. This may happen, for instance, to any particular particle, by reason of the fact that a non-combustible portion is completely surrounded by a combustible portion and by the time the combustible portion has been burned off the particle has been caught by the strong draft and carried out of chamber 56. However, if these particles are repeatedly introduced into chamber 56 it is obvious that they will eventually be melted down or caught in the rain of melted particles or become attached to melted particles by the flock action which exists in such furnaces.

The non-combustible, consisting mostly of fly ash, is collected from the outgoing gas by the filter and then conveyed into the stream of incoming air and therefore is carried back into combustion chamber 56.

The disposition of the slag from a slag-tap furnace is a comparatively simple and inexpensive matter and in fact the cooled slag, which is glass hard, has some commercial value and therefore the cost of disposing of the same is very small and in fact sometimes represents a profit. On the other hand, methods of disposing of fly ash, regardless of the method employed for collecting the fly ash from the flue gas, have been expensive and by no means satisfactory. It will be clear that my arrangement not only filters the flue gas and removes the fly ash therefrom but that it disposes of the fly ash in a less expensive and more satisfactory manner than any method heretofore employed.

While I have described certain features more or less in detail, it will be understood that the invention will employ various devices of differing forms and construction and it is to be understood that the invention is not to be limited except by the scope of the appended claims taken in conjunction with the state of the prior art.

What I claim is:

1. The combination with a coal-burning furnace for operation at a temperature of 3000 degrees Fah. and higher and having a duct for conducting flue gases, containing fly ash and dust, away from the furnace and a duct for conveying combustion air under pressure to the furnace; of an endless woven fabric filter belt positioned to pass first through the flue gas duct, for filtering ash and dust from the flue gas and accumulating the same on the belt, and thence through the combustion air duct for introducing the ash and dust from the belt into the stream of combustion air at a point between the filter and the furnace, and means for continuously driving the said endless belt.

2. The combination with a fuel burning furnace for operation at relatively high temperatures and having a duct for conducting flue gases, containing fly ash and dust, away from the furnace and a duct for conveying combustion air under pressure to the furnace; of an endless filter belt positioned to pass first through the flue gas duct, for filtering fly ash and dust from the flue gases and accumulating the same on the belt, and thence through the combustion air duct for introducing the ash and dust from the belt into the stream of combustion air at a point between the filter and the furnace, and means for continuously driving the said endless belt.

RALPH C. ROE.